United States Patent [19]

Lamont, Jr.

[11] Patent Number: 5,040,471

[45] Date of Patent: Aug. 20, 1991

[54] HAND VEGETABLE TRANSPLANTER WITH ASSEMBLY FOR VARYING QUANTITY OF LIQUID DISPENSED.

[75] Inventor: William J. Lamont, Jr., Manhattan, Kans.

[73] Assignee: Kansas State University Research Foundation, Manhattan, Kans.

[21] Appl. No.: 557,910

[22] Filed: Jul. 25, 1990

[51] Int. Cl.$^5$ .......................... A01C 5/02; A01C 23/02
[52] U.S. Cl. ..................... 111/108; 111/7.2; 111/95
[58] Field of Search .................. 111/100, 106, 108, 89, 111/92, 95, 7.1, 7.2

[56] References Cited

U.S. PATENT DOCUMENTS

| 1,098,221 | 5/1914 | Boyles | 111/108 |
| 2,165,663 | 7/1939 | Thomas | 111/108 |
| 2,165,664 | 7/1939 | Thomas | 111/108 |
| 2,195,765 | 4/1940 | Caulk | 111/108 |

Primary Examiner—Dennis L. Taylor
Assistant Examiner—Spencer Warnick
Attorney, Agent, or Firm—Hovey, Williams Timmons & Hovey

[57] ABSTRACT

Apparatus (10) for transplanting of vegetables or other plants is provided which eliminates stoop labor while properly placing plants (142) within earth openings (84); at the same time, a measured quantity of liquid (42) is delivered to the opening (84). The apparatus (10) includes a pair of elongated, juxtaposed, frustoconical chamber (12, 14) each equipped with selectively actuatable stopper means (16, 18) adjacent the lower ends thereof. Actuation of a pivotal operating handle (90) simultaneously opens the stopper means (16, 18) for delivery of a plant (142) and liquid (42) to a plant site. An adjusting assembly (106) is provided for varying the amount of liquid (42) delivered during each transplanting operation.

5 Claims, 3 Drawing Sheets

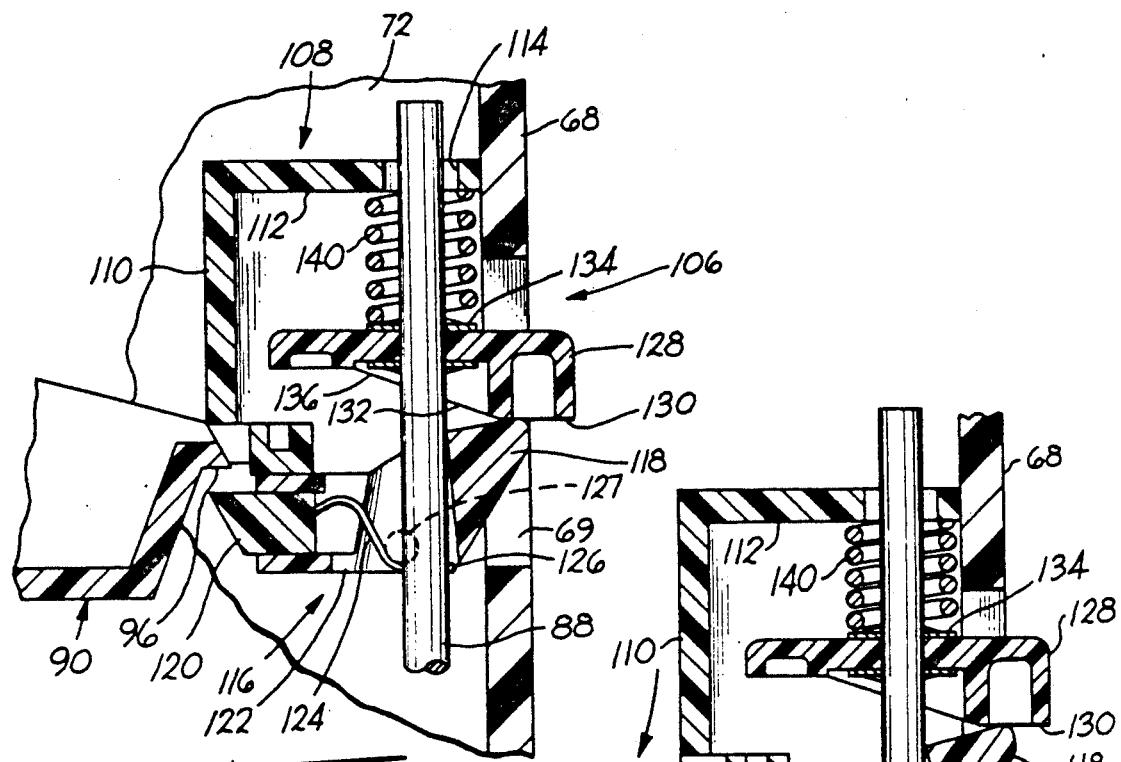
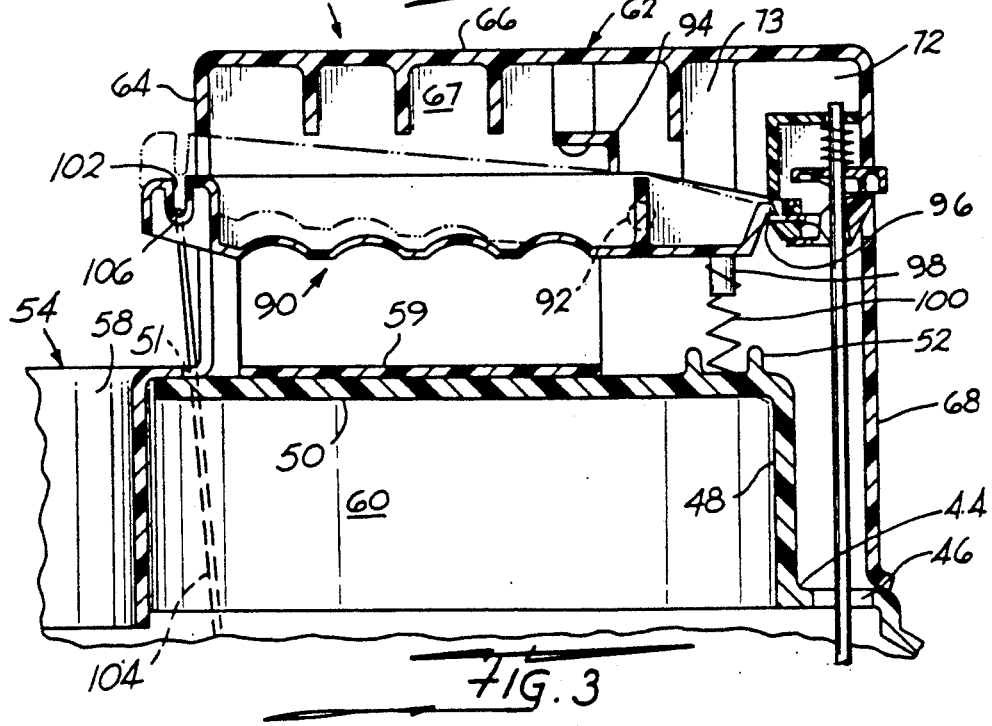

HAND VEGETABLE TRANSPLANTER WITH ASSEMBLY FOR VARYING QUANTITY OF LIQUID DISPENSED.

BACKGROUND OF THE INVENTION

1. Field of the Invention

The present invention is broadly concerned with apparatus for the manual transplanting of vegetables or other plants in a quick, efficient manner. More particularly, it is concerned with such transplanter apparatus which is characterized by provision of a pair of side-by-side, frustoconical chambers respectively adapted for holding a plant and liquid (e.g. water or a mixture of water and plant nutrients); the apparatus further includes a pointed, conical lowermost end to facilitate earth boring, together with selectively openable stopper means for permitting a plant to fall from the plant chambers while it is simultaneously being watered from the liquid chamber.

2. Description of the Prior Art

Small commercial vegetable growers, university research and extension personnel, and even home gardeners are often required to transplant small plants or seedlings of selected crops. The traditional method of transplanting involves use of a small garden tool to dig an appropriate opening in the earth, followed by placing the plant in the opening, backfilling with earth and watering. While transplanting can be accomplished in this manner, it can be backbreaking work, particularly if a large number of plants are to be transplanted.

It has also been known in the past to provide a so-called "tobacco setter" which has been used in tobacco fields for transplanting purposes. Such a device is believed to comprise a simple frustoconical body used as a guide for dropping plants into prepared openings. Devices of this character are not presently being produced.

SUMMARY OF THE INVENTION

The present invention provides a greatly improved transplanter apparatus designed to materially increase the speed and efficiency of transplanting operations. Broadly speaking, the transplanter apparatus comprises structure defining a pair of elongated, juxtaposed chambers each presenting an upper end and an opposed, lower delivery end, with one of the chambers being adapted to receive plants, while the other holds a liquid such as water or a water/nutrient mix. Stopper means is provided adjacent the lower delivery ends of the chambers for retaining plants and liquids within the individual chambers; and manual operating means is provided for selective opening of the stopper means during transplanting operations.

In particularly preferred forms, the respective transplanter chambers are of generally frustoconical configuration and are equipped with substantially pointed, conical structure depending from the lower ends thereof to define an earth boring member to facilitate the making of plant-receiving openings in the earth. Advantageously, the lowermost boring member includes a stationary section beneath the liquid-receiving chamber, and a pivotal, selectively openable section beneath the plant-receiving chamber.

The stopper assembly for the liquid-receiving chamber is advantageously in the form of an elongated, vertically shiftable rod carrying a resilient stopper adjacent the lower end thereof. The stopper in turn mates with a liquid drain opening in the bottom wall of the chamber. Operating means for the liquid stopper assembly comprises a pivotal handle which operates an adjustable device permitting variance in the amount of liquid delivered during each transplanting operation. Specifically, the adjustable device is in the form of an apertured rocker member positioned adjacent the pivotal handle and engagable thereby, with the operating rod passing through the rocker member. The latter is pivotal about an axis transverse to the longitudinal axis of the operating rod. A rotatable cam is carried by the operating rod above the rocker member for lifting of the cam, and hence the operating rod, when the rocker member is pivoted. The cam is rotatably adjustable for varying the vertical movement of the rod and thus the amount of liquid delivered from the liquid-receiving chamber during a given transplanting operation.

BRIEF DESCRIPTION OF THE DRAWINGS

FIG. 3 is a greatly enlarged, fragmentary vertical sectional view depicting the detail of construction of the apparatus adjacent the upper operating handle thereof;

FIG. 4 is a fragmentary vertical sectional view depicting the lower stopper arrangement of the liquid-receiving chamber of the transplanter;

FIG. 5 is a fragmentary vertical sectional view illustrating the upper end of the stopper rod and the adjustable mechanism permitting delivery of variable quantities of liquid from the liquid-receiving chambers; and FIG. 6 is a fragmentary sectional view similar to that of FIG. 5 but showing the opening operation of the stopper rod.

DESCRIPTION OF THE PREFERRED EMBODIMENT

Figure 1:
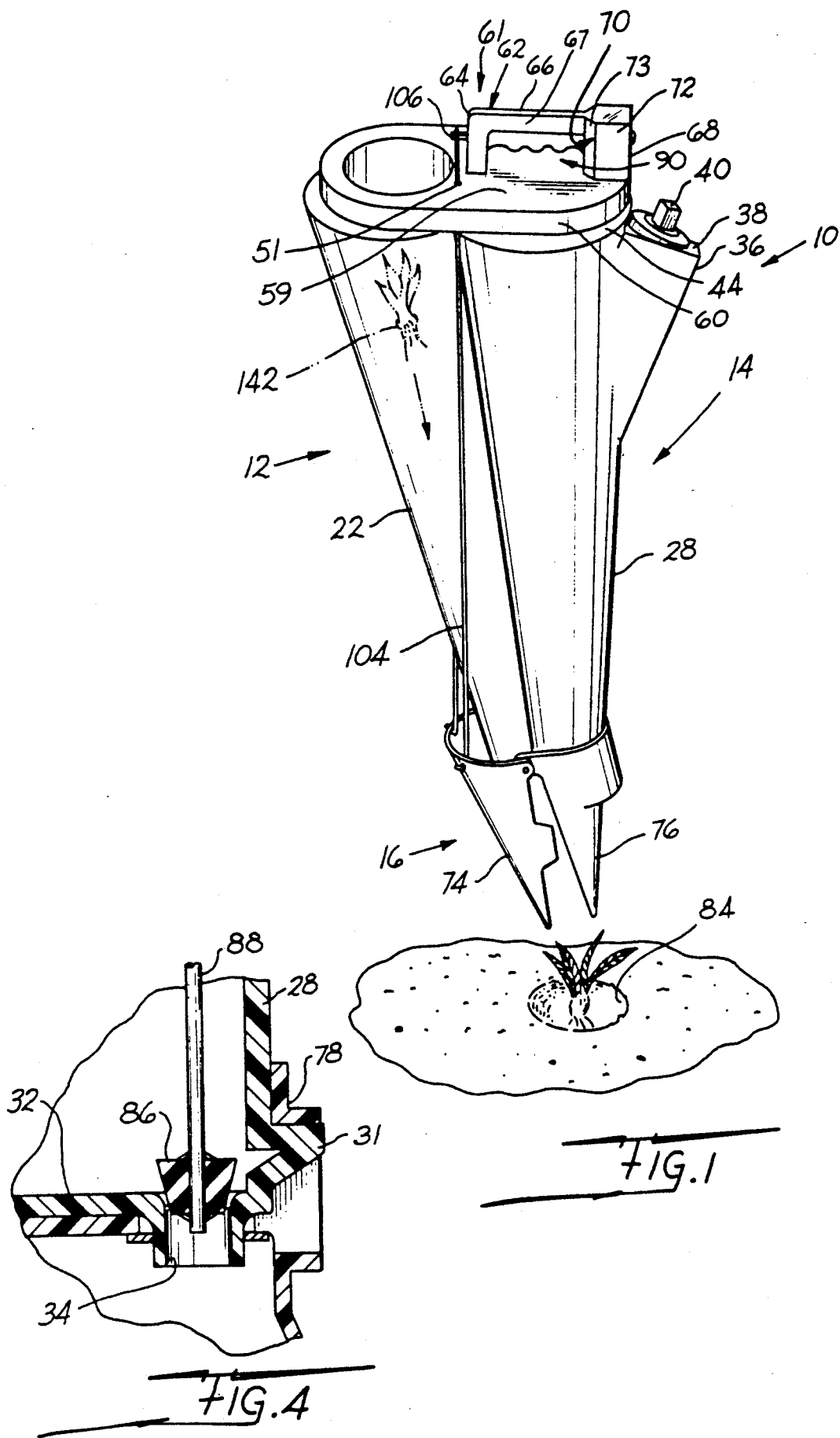
FIG. 1 is a perspective view illustrating the transplanter of the invention during use thereof in transplanting a vegetable.
Figure 2:
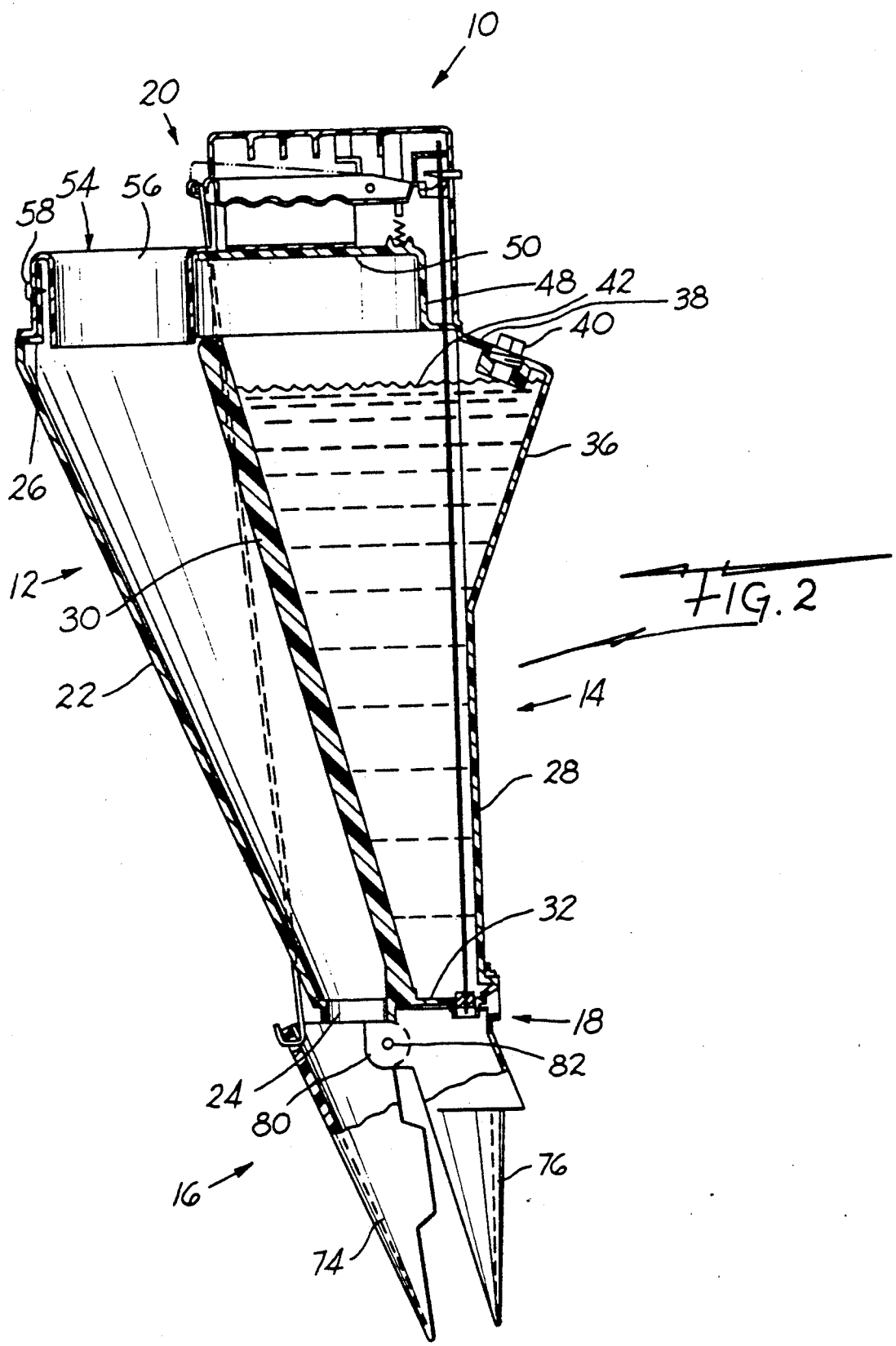
FIG. 2 is a view in partial vertical section of the transplanter apparatus.

Turning now to the drawing and particularly FIGS. 1–2, it will be seen that the transplanter apparatus 10 of the invention is in the form of an elongated, tapered, synthetic resin body presenting a frustoconical, open-top plant-receiving chamber 12, a juxtaposed, frustoconical liquid-receiving chamber 14, selectively openable stopper means 16, 18 for the chambers 12, 14, and operating means broadly referred to by the numeral 20 for selective opening of the stopper means 16, 18 during transplanting operations.

In more detail, the plant-receiving chamber 12 is defined by an arcuate, tapered, generally circular in cross-section sidewall 22 which presents a lowermost, open delivery end 24. The upper end of sidewall 22 terminates in an upstanding, arcuate wall 26 (see FIG. 2).

Liquid-receiving chamber 14 is likewise of tapered, generally frustoconical configuration and is defined by an elongated, generally circular in cross-section sidewall 28 which merges with and is connected to adjacent sidewall 22 at central region 30 between the chambers 12, 14. The chamber 14 is further provided with an outer lip 31 (see FIG. 4) and a transverse bottom wall 32 having a downturned, circular in cross section, outlet-defining wall 34 adjacent the righthand end thereof as viewed in FIGS. 2 and 4. The upper end of wall 28 includes an oblique, arcuate wall section 36 having an integral, apertured top wall 38. The top wall 38 is equipped with a removable filler plug 40 which permits filling of the chamber 14 with liquid 42 (see FIG. 2). The top of chamber 14 is defined by an in-turned ledge section 44 having an aperture 46 (see FIG. 3) therethrough, along with an upstanding inboard wall segment 48 as well as a horizontally extending topmost wall segment 50, the latter being equipped with a pair of rod-clearing openings 51 therethrough and an upstanding annular spring-retaining wall 52.

An additional top wall segment 54 is positioned above wall 22 and is in the form of an annular, U-shaped in cross-section wall member 56 which is positioned over wall 26 and secured thereto by means of screw 58. A horizontal wall portion 59 extends laterally from member 56 and overlies wall 50; an integral skirt 60 depends from portion 59 as shown and abuts ledge 44. An upstanding extension 61 of inverted, generally U-shaped configuration is also provided, in the form of a hollow housing 62 presenting an upstanding, bifurcated end wall 64, top wall 66, depending sidewalls 67, end wall 68 apertured as at 69, inboard vertical wall 70 and vertical connecting walls 72, 73.

The lowermost end of apparatus 10 presents a pair of tapered, mating bodies 74, 76. The body 76 is fixedly secured to the lowermost end of wall 28, by means of a connector segment 78 resting atop and secured to lip 31 as depicted in FIG. 4. The left hand margin of body 76 as viewed in FIGS. 1 and 2 presents a pair of opposed, circular extensions 80. The mating body 76 is likewise of tapered configuration and is pivotally secured to the extensions 80 by means of transverse cross pin 82. The left hand uppermost margin of the body 74 extends laterally from the adjacent surface of sidewall 22 as best seen in FIG. 1. When the pivotal body 76 is shifted to its closed position, the body 74, 76 cooperatively present a pointed, essentially conical earth-boring member for facilitating the making of plant-receiving openings in the earth, such as the opening 84 illustrated in FIG. 1.

The function of the stopper means 16 for chamber 12 is effected by the above-described body 74 which can be selectively opened to permit gravitation of a plant from the chamber 22. On the other hand, stopper means 18 for the liquid-receiving chamber 14 is in the form of a resilient stopper plug 86 sized to mate with the outlet-wall structure 34 for preventing escape of liquid 42 from the chamber 14. The stopper 42 is in turn mounted on an upright, vertically reciprocable operating rod 88.

Operating means 20 for the respective stopper means 16, 18 includes an operating handle 90 positioned generally within housing 62. The handle 90 is pivotally mounted by means of transverse pin 92, with the up and down movement of the handle being guided by internal bracket 94 secured to housing wall 66. The right hand end of handle 90 as viewed in FIGS. 3 and 5 presents a terminal operating lip 96, as well as a downwardly extending spring-retaining stud 98. A helical spring 100 is secured to stud 98 and extends downwardly for retention by upstanding wall 52; in this fashion, the spring 100 biases handle 90 to the lowered position thereof shown in full lines in FIG. 3. The left hand end of handle 90 extends through bifurcated front wall 64 and is slotted as at 102.

Control of stopper means 16 (i.e., body 74) is effected by means of a U-shaped rod 104 having a central bight 106. The latter is received within slot 102 of handle 90, whereas the legs of the rod 104 extend downwardly through the openings 51 and are operatively coupled to the left hand upper margin of the body 74.

Operating means 20 for the plug 86 includes, adjacent the upper end of rod 88 within housing 62, an adjustment assembly 106 permitting selective variance of the amount of liquid delivered from chamber 14 during each transplanting operation. The assembly 106 includes an inner housing 108 having a front wall 110 and top wall 112 provided with a rod-clearing aperture 114 therethrough. In addition, the overall assembly 106 includes a rocker member 116 which is somewhat U-shaped in plan configuration, presenting a cam end 118 situated within opening 69 and an opposed rocker block 120 positioned for engagement by lip 96 of handle 90 (see FIG. 5). The rocker member 116 also has a relatively large passageway 122 extending therethrough which receives rod 88 and permits rocking movement of the member 116 as will be described. An integral, synthetic resin, somewhat S-shaped spring 124 is situated within passage 122. The spring 124 is connected to the right-hand face of block 120 as viewed in FIG. 5, and extends downwardly therefrom to terminate in a hook-like section 126 operatively secured to the lower margin of the passage and engaging rod 88. As illustrated, the member 116 is pivotal about a transverse pivot pin 127.

A rotatable adjusting cam 128 presenting a flattened end 130 and an inclined cam surface 132 is positioned above rocker member 116. The cam 128 is secured to rod 88 by means of push nuts 134, 136 so that the cam is rotatable relative to the rod but does not shift along the length thereof. A coil spring 140 extends between the upper surface of cam 128 and the underside of wall 112, and biases rod 88 downwardly so as to normally maintain plug 86 in its lowered, liquid flow-blocking position.

In the use of apparatus 10, chamber 14 is first filled with a desired liquid, by opening plug 40 and conventionally filling the chamber. At this point a desired plant 142 may be dropped downwardly through the opening defined by wall member 56 above chamber 12, so that the plant falls to the bottom of the chamber and is retained from exiting the apparatus 10 by means of body 74. The user then proceeds to the desired transplanting site, and uses the conical lowermost end of the apparatus to bore an opening 84 into the earth. This simply involves grasping the device by handle 90 and housing 62, and pressing downwardly into the earth with a slight twisting motion.

The apparatus 10 may then be partially withdrawn from the opening and handle 90 is pivoted upwardly. This has the effect of essentially simultaneously opening the chambers 12 and 14. Specifically, chamber 12 is opened by virtue of pivoting of the body 74 to the position depicted in FIG. 2, thereby permitting the plant to fall under the influence of gravity into opening 84. Of course, the sloping nature of the members 74, 76 ensures that the plant will be properly guided into the earth opening.

Upward pivoting of the handle 90 opens chamber 14 for a precise time determined by the position of adjusting assembly 106. In particular, attention is directed to FIGS. 5 and 6. In FIG. 5, the assembly 106 is shown in its rest position wherein spring 140 is biasing the plug 86 to its flow-blocking position. Upon pivoting of the handle 90 operating lip 96 comes into engagement with rocker block 120, thereby pivoting the entire member 116 about pin 127. During such pivoting, cam end 118 engages the underside of cam 128, thereby lifting the latter and rod 88 against the bias of spring 140. As a consequence, plug 86 is lifted out of its flow-blocking orientation with wall structure 34, permitting fluid flow from the chamber 14. As the rocker member 116 continues to be pivoted under the influence of handle 90, a position is reached (see FIG. 6) wherein lip 96 clears the edge of rocker block 120. When this occurs, the spring 124, which has been deformed by virtue of its engagement with rod 88, quickly pivots the assembly 116 back to its normal FIG. 5 rest position. Upon release of handle 90, spring 100, which has been compressed between downwardly displaced stud 98 and wall 52, urges stud 98 upwardly. This causes handle 90 to pivot about pin 92 to reassume its starting position. The stroke of rod 88, and thus the period of displacement of plug 86 and consequent volume of fluid delivered, may be adjusted by manual rotation of cam 128 about rod 88. Adjustment of the upward vertical travel of rod 88 is effected by rotation of cam 128 such that cam end 118 engages either flattened end 130 or ramp section 132. As will be readily appreciated, maximum vertical travel of the rod 88, and correspondingly maximum liquid delivery from chamber 14, occurs when the cam 128 is in the FIG. 5 position thereof.

It will thus be seen that the present invention provides a greatly improved transplanter apparatus characterized by simplicity of design and efficiency of operation. Actual experimentation with a transplanter apparatus in accordance with the invention has demonstrated that transplanting operations are greatly eased through its use.

I claim:

1. Apparatus for transplanting of vegetables or other plants, comprising:
    structure defining a pair of elongated, juxtaposed chambers each presenting an upper end, an opposed, lower delivery end and sidewalls between said upper and lower ends, one of said chambers being adapted to receive a plant, and the other chamber being adapted to receive a liquid;
    selectively openable stopper means adjacent the delivery ends of said chambers for respectively retaining the plant and liquid within the chambers, said stopper means for said other chamber including an elongated, selectively reciprocable operating rod carrying a liquid flow-blocking stopper adjacent the lower end thereof, said rod being shiftable between a raised position permitting liquid flow through the associated lower delivery end, and a lowered, flow blocking position; and
    operating means for selectively opening said stopper means for delivery of a plant from said one chamber and liquid from said other chamber, said operating means including a pivotal handle operatively coupled with an upper end of said operating rod, and adjustable means for delivery of a preselected quantity of liquid from said other chamber upon pivoting of said handle, said adjustable means comprising—.
    structure defining an opening through said sidewall of said other chamber, and
    shiftable means operably coupled with said operating rod and extending at least in part though said opening, said shiftable means including structure for permitting selective adjustment of the quantity of liquid delivered by manipulation exteriorly of said other chamber.

2. Apparatus as set forth in claim 1, including structure adjacent the delivery ends of said chambers for boring of plant-receiving openings in the earth.

3. Apparatus as set forth in claim 1, said stopper means further comprising an elongated, tapered, first body depending from said one chamber, and means pivotally supporting said first body for movement between a closed position for retaining a plant, and an open position permitting the plant to fall downwardly under the influence of gravity, there being an elongated, tapered second body depending from said other chamber, said first and second bodies cooperatively presenting a generally conical earth-boring member when said first body is in the closed position thereof.

4. Apparatus as set forth in claim 1, said adjustable liquid delivery means comprising:
    an apertured rocker member positioned adjacent said handle with said operating rod passing through the rocker member, for engagement by said handle upon pivoting thereof;
    means pivotally mounting said rocker member for pivoting about an axis transverse to the longitudinal axis of said operating rod when said handle is pivoted;
    a rotatable cam carried by said rod above said rocker member;
    means biasing said rocker member to a position beneath said cam and with said operating rod in its lowered, liquid flow-blocking position,
    said cam being rotatably adjustable for varying vertical movement of said rod upon pivoting of said handle and consequent engagement with said rocker member.

5. Apparatus as set forth in claim 1, said operating means including structure for substantially simultaneously opening the stopper means for both of said chambers.

* * * * *